(12) United States Patent
Tsukada

(10) Patent No.: US 7,557,952 B2
(45) Date of Patent: Jul. 7, 2009

(54) COLOR CONVERSION METHOD AND COLOR CONVERSION DEVICE

(75) Inventor: Masato Tsukada, Tokyo (JP)

(73) Assignee: NEC Corporation, Tokyo (JP)

( * ) Notice: Subject to any disclaimer, the term of this patent is extended or adjusted under 35 U.S.C. 154(b) by 795 days.

(21) Appl. No.: 10/515,216

(22) PCT Filed: May 22, 2003

(86) PCT No.: PCT/JP03/06391

§ 371 (c)(1),
(2), (4) Date: Nov. 22, 2004

(87) PCT Pub. No.: WO03/101084

PCT Pub. Date: Dec. 4, 2003

(65) Prior Publication Data

US 2005/0179915 A1    Aug. 18, 2005

(30) Foreign Application Priority Data

May 23, 2002    (JP)    ............................. 2002-149745

(51) Int. Cl.
  G06F 15/00    (2006.01)
  G06K 1/00    (2006.01)
  H04N 1/60    (2006.01)
(52) U.S. Cl. ........................................ 358/1.9; 358/1.2
(58) Field of Classification Search ......... 358/1.9–3.32, 358/500–540, 1.2

See application file for complete search history.

(56) References Cited

U.S. PATENT DOCUMENTS 5,619,348 A    4/1997    Tokai (Continued)

FOREIGN PATENT DOCUMENTS

JP    H02-226870 A    9/1990

(Continued)

OTHER PUBLICATIONS

Chosson, et al., "Visually-based color space tetrahedrizations for printing with custom inks", Proceedings of SPIE—The International Society for Optical Engineering 2001, Color Imaging: Device-Independent Color, Color Hardcopy, and Graphic Arts VI, Jan. 2001, pp. 81-92, vol. 4300, XP002466534.

(Continued)

*Primary Examiner*—Douglas Q Tran
(74) *Attorney, Agent, or Firm*—Sughrue Mion, PLLC

(57) ABSTRACT

A color conversion method robust for unstableness of color reproduction in a color image device is provided. A color converting device (103) includes color data input means (1) for reading therein color device values and measured color data thereof of a color image device, a color data storage memory (2) for storing color device values and measured color data, Delaunay diagram constructing and shaping means (8) for constructing a Delaunay diagram using measured data distributed in a three-dimensional color space and deleting unnecessary Delaunay tetrahedrons, a Delaunay tetrahedron storage memory (4) for storing subdivision information of Delaunay tetrahedrons, Delaunay tetrahedron searching and color device value calculating means (9) for searching for a Delaunay tetrahedron including input colors and calculating associated color device values, and paste processing and associated color calculating means (7) for pasting, when the Delaunay tetrahedron including the input colors cannot be retrieved, the input colors to a point on a triangular plane of one of the Delaunay tetrahedrons and calculating associated color device values.

8 Claims, 17 Drawing Sheets

U.S. PATENT DOCUMENTS

| | | | |
|---|---|---|---|
| 6,480,301 B1 * | 11/2002 | Cholewo | 358/1.9 |
| 6,560,361 B1 * | 5/2003 | Collins | 382/203 |
| 2002/0031258 A1 | 3/2002 | Namikata | |
| 2002/0060797 A1 | 5/2002 | Namikata | |

FOREIGN PATENT DOCUMENTS

| | | |
|---|---|---|
| JP | H06-22124 A | 1/1994 |
| JP | H07-288706 A | 10/1995 |
| JP | H08-116460 A | 5/1996 |
| JP | H09-284578 A | 10/1997 |
| JP | H10-341353 A | 12/1998 |
| JP | 200264721 A | 2/2002 |
| JP | 2002-94812 A | 3/2002 |
| JP | 2002-94813 A | 3/2002 |
| JP | 2002-118759 A | 4/2002 |
| WO | WO 98/19452 A1 | 5/1998 |

OTHER PUBLICATIONS

Hardeberg, et al., "Color Printer Characterization Using a Computational Geometry Approach", Proceedings of the Color Imaging Conference: Color Science, Systems, and Applications 1997, 1997, pp. 96-99, XP002466535.

Hiroshi Inagaki et al., "Robust Algorithm for Incremental Construction of Three-Dimensional Voronoi Diagrams", Journal of Information Processing Society of Japan, vol. 35, No. 1, Jan. 1994, pp. 1-10.

Hiroshi Inagaki et al, "Problems Caused by Degeneracy in Construction of the Three-Dimensional Delauncy Diagram and Its Solution", Transactions of IEICE of Japan, vol. J79-D-II, No. 10, Oct. 1996, pp. 1696-1703.

\* cited by examiner

FIG. 4
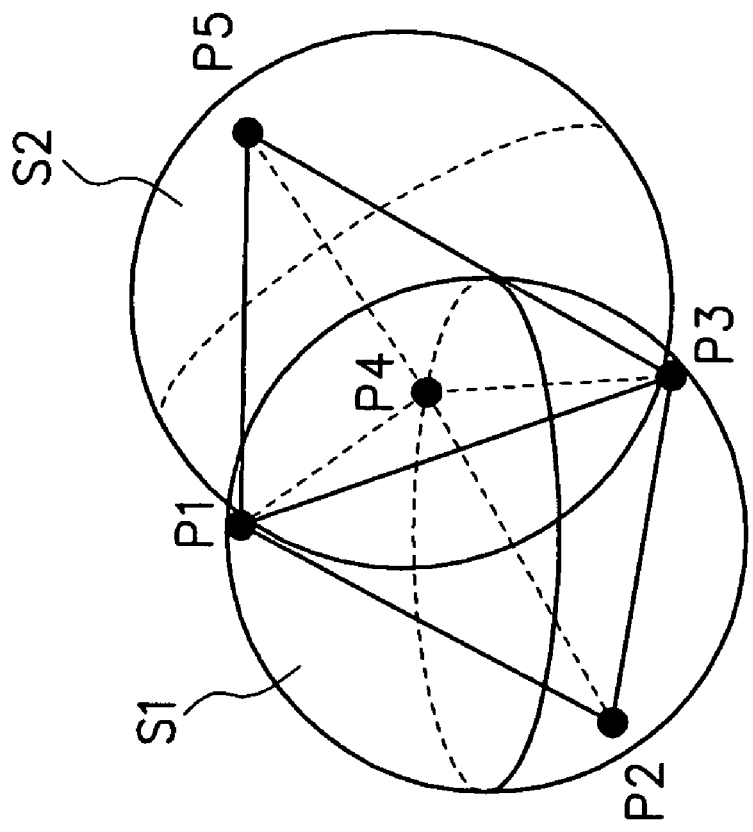
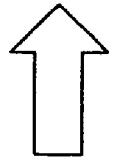
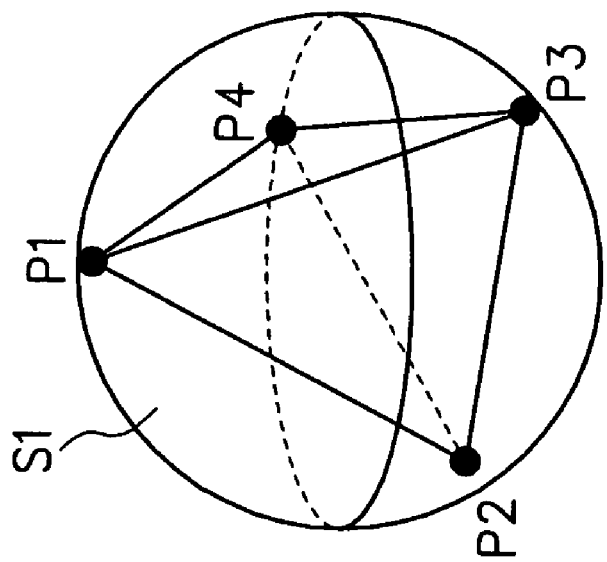

F I G. 5
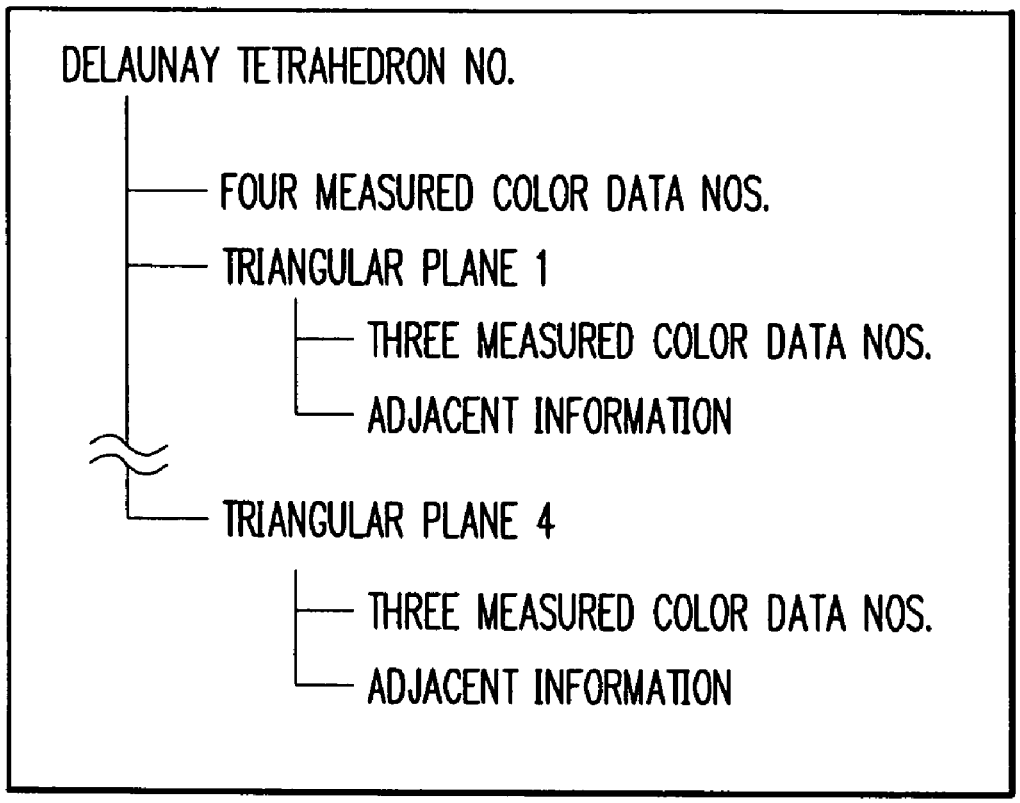

F I G. 9
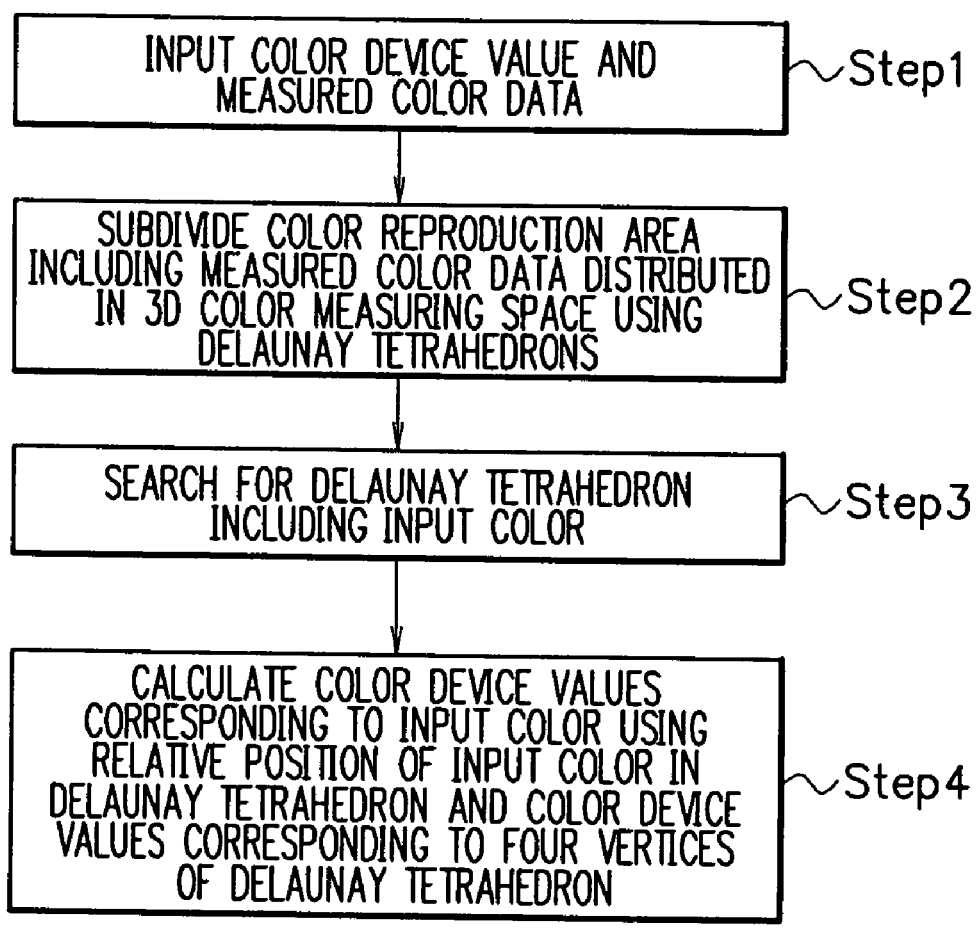

F I G. 11
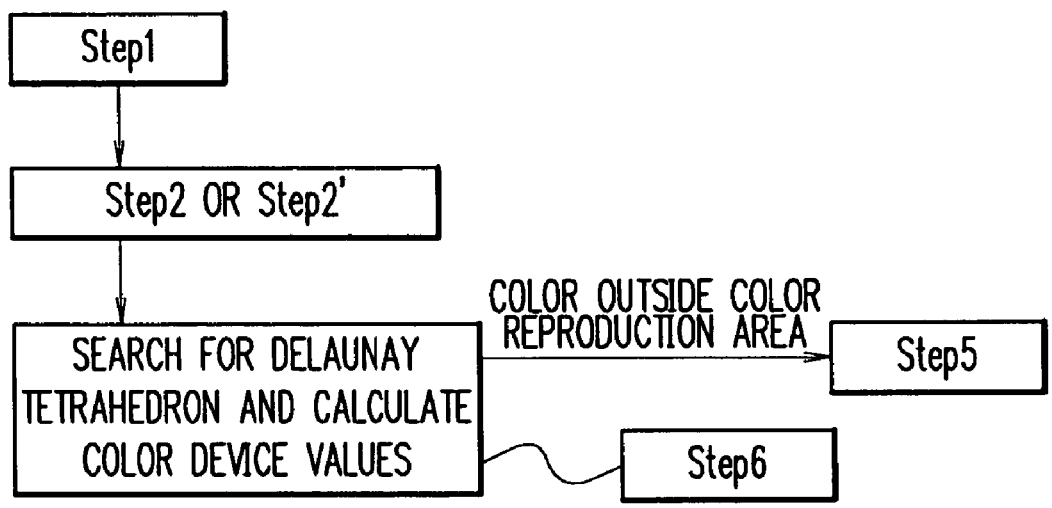

F I G. 12
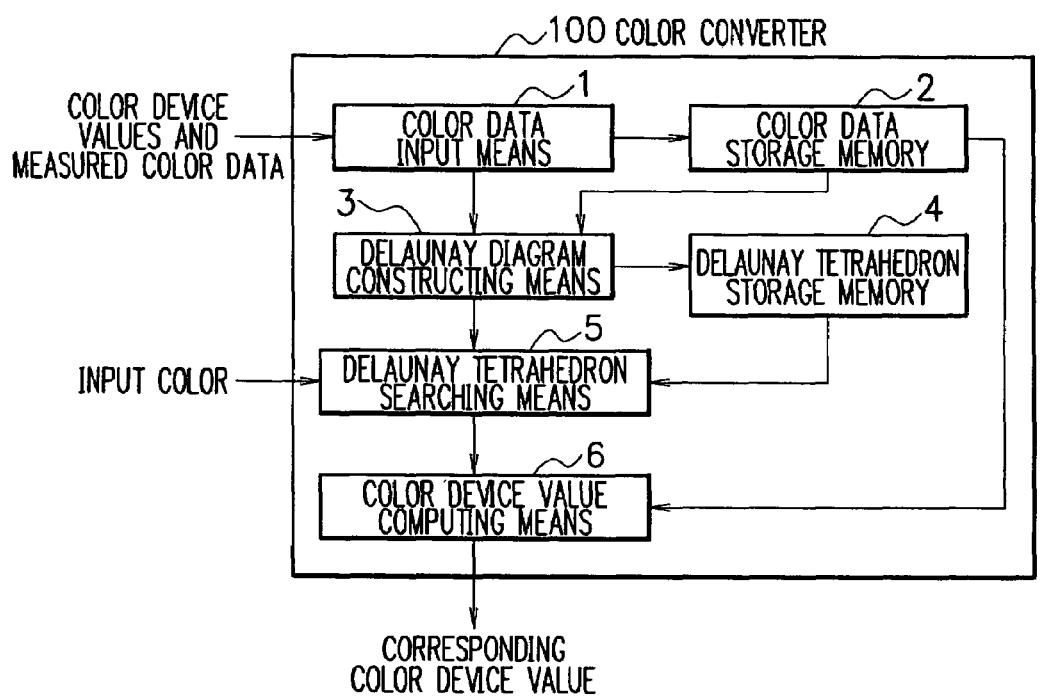

F I G. 13

| DATA NO. | COLOR DEVICE VALUE | MEASURED COLOR DATA |
|---|---|---|
| 1 | $C_1, M_1, \cdots X_1$ | $L_1, a_1, b_1$ |
| 2 | $C_2, M_2, \cdots X_2$ | $L_2, a_2, b_2$ |
| --- | ---------- | ---------- |
| K-1 | $C_{K-1}, M_{K-1}, \cdots X_{K-1}$ | $L_{K-1}, a_{K-1}, b_{K-1}$ |
| K | $C_K, M_K, \cdots X_K$ | $L_K, a_K, b_K$ |

F I G. 14
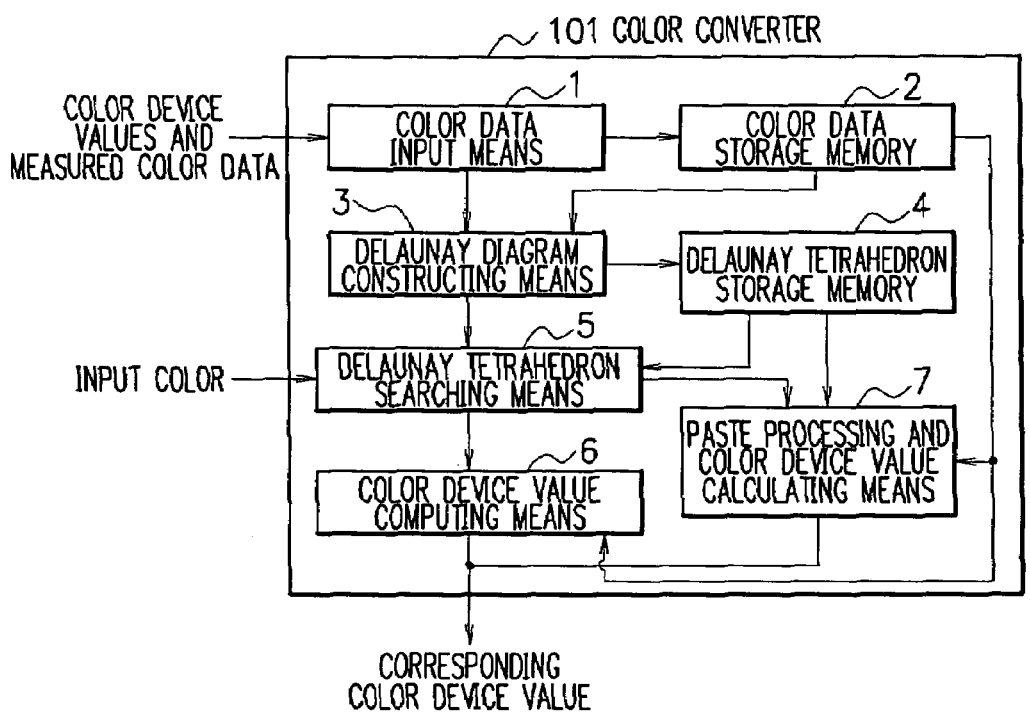

F I G. 15
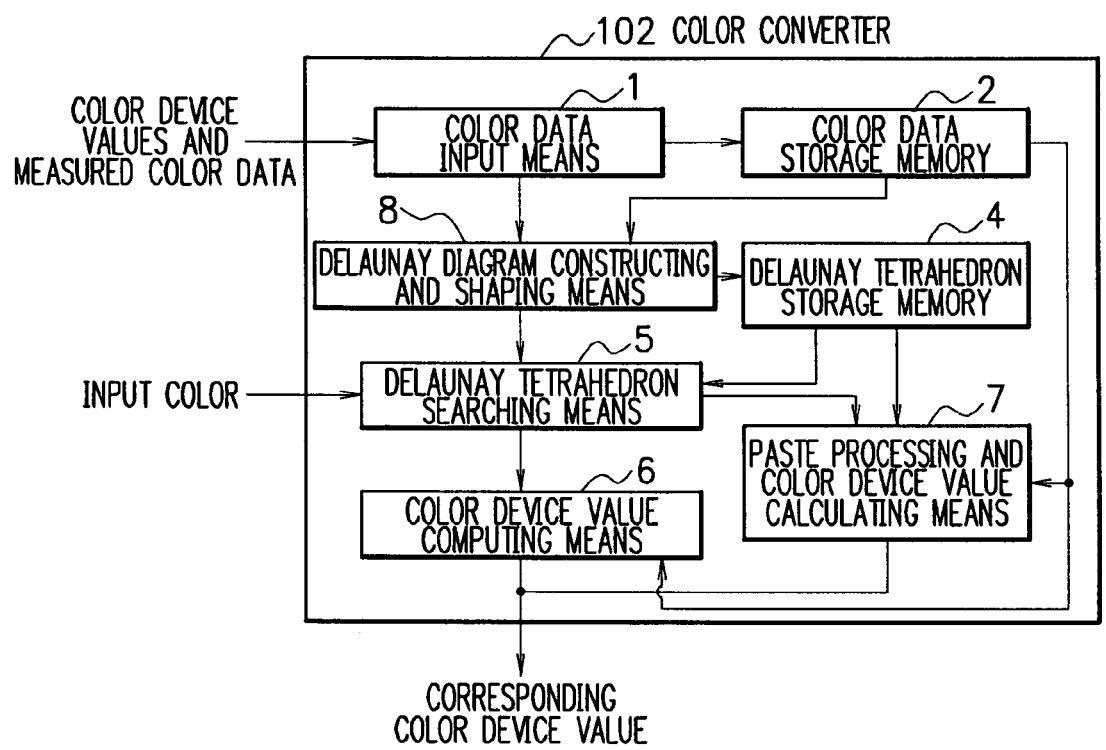

F I G. 16
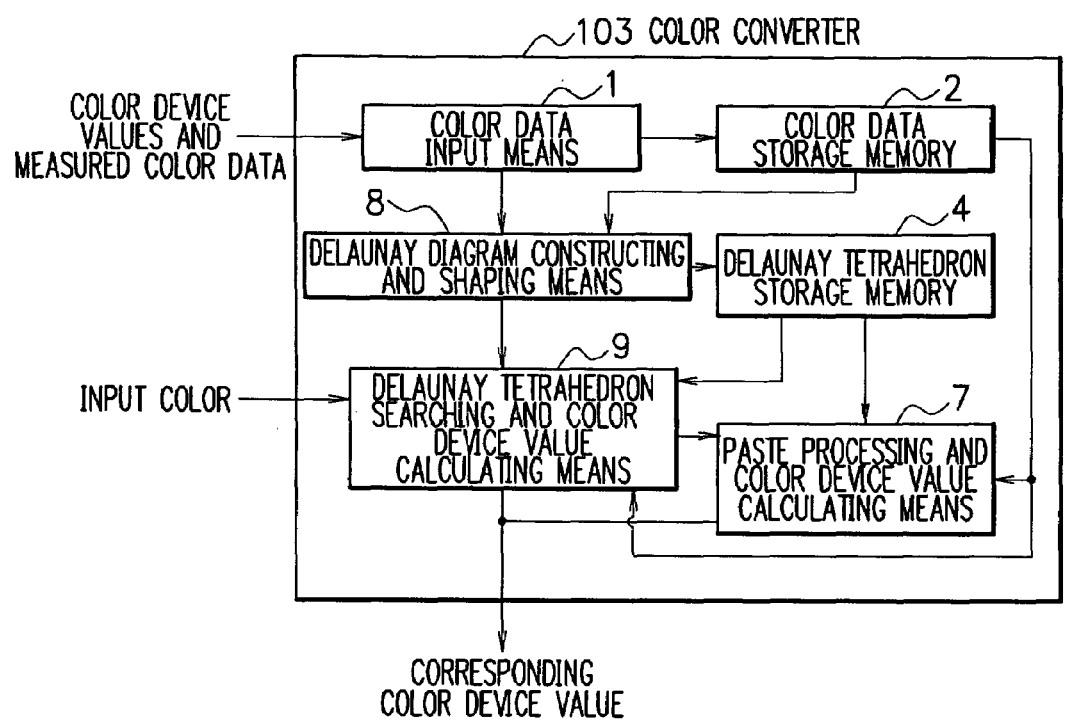

COLOR CONVERSION METHOD AND COLOR CONVERSION DEVICE

TECHNICAL FIELD

The present invention relates to a color conversion method, a color converting device, and a color conversion program, and in particular, to a color conversion method, a color converting device, and a color conversion program in which any particular color reproduction model is not required and its measured color data is highly appreciated even for a color image device having a complex color reproduction characteristic.

RELATED ART

There have been proposed many methods of printing a color image displayed on an image display such as a cathode-ray tube (CRT) monitor using an image output device such as a printer or a printing machine while keeping color reproduction. For example, Japanese Patent Laid-Open No. Hei2-226870 provides a method in which a reproduced color obtained according to a combination of N basic colors is produced to obtain a combination of basic colors corresponding to a target value by use of values of a color representing system. In this method, specifically, in an image output device to conduct color reproduction using N basic colors, a color patch is measured according to a combination of basic colors to obtain a combination of N colors and its measured value. Moreover, in the N-color basic color space, basic colors constituting color patches adjacent to each other are linked with each other to subdivide the space using polyhedrons having N+1 vertices without any gap therebetween. For example, in a case of cyan, magenta, and yellow (CMY) ink, there is constructed a group of tetrahedrons (triangular pyramids) obtained by linking adjacent vertices in a three-dimensional space of the CMY ink. In this case, the vertices are quantities of the CMY ink constituting the color patches and are specified to be distributed in the CMY ink space while keeping an order. Moreover, in a three-dimensional space of L*u*v*, by directly applying linkage information of tetrahedrons in the CMY ink space, there are constructed a group of tetrahedrons by linking four measured values L*u*v* with each other.

FIG. 1 shows, in a two-dimensional plane, a case in which subdivision information of the CMY ink space is applied to an L*u*v* space. Incidentally, in FIG. 1, the L*u*v* space is represented in a two-dimensional plane of lightness L and chroma saturation C. Four points A, B, W, and K in the CMY space respectively correspond to A', B', W', and K' in the color space L*u*v* space. Assuming that an L*u*v* value is inputted as an input color, a tetrahedron containing the input color is retrieved from a group of tetrahedrons in the L*u*v* space, and a CMY ink quantity corresponding to the input color is calculated through a linear transformation using CMY ink quantities corresponding to four vertices of the tetrahedron. In this regard, a combination of N basic colors implementing a reproduced color corresponding to a target value is calculated using (N+1) color representing values forming a space enclosing the target value in L*u*v* and a combination of (N+1) basic colors corresponding to the (N+1) color representing values.

Japanese Patent Laid-Open No. Hei7-288706 provides a color conversion method for an image output device conducting color reproduction using a combination of cyan, magenta, yellow, and black (CMYK) ink of four colors. In this method, reproduced colors obtained by combinations of CMYK four color inks are produced and are measured to obtain a correspondence between the CMYK four color inks and the measured color values. Moreover, by fixing the K ink quantity, a color gamut represented by combinations of the remaining CMY three color inks is obtained, and then the area is subdivided using triangular pyramids. This is conducted for all K ink quantities.

FIG. 2 shows an illustration. That is, when the K ink quantities of M-level gradation are measured, the color gamut of the image output device includes M color gamuts. M=4 in FIG. 2. Additionally, the M color gamuts with the fixed K ink quantity are subdivided using a triangular pyramid having vertices of CMY three color ink quantities. The subdividing method can be implemented by applying the subdivision information in the ink space to the subdivision information in the color measuring space as in Japanese Patent Laid-Open Publication Ser. No. 2-226870. In a case in which input colors is given, from M color gamuts in the color measuring space as color reproduction of the image output device, one or more triangular pyramids including the input color are obtained to calculate CMYK ink quantities corresponding to the input color according to CMY ink quantities corresponding to the vertices of the respective triangular pyramids and K ink quantities allocated to the respective gamuts. When there exist at least P (P>1) triangular pyramids including the input color, the CMYK ink quantities corresponding to the input color can be obtained from P sets of CMYK ink quantities. For example, one of the P sets is selected as a set of CMYK ink quantities; or, one set of CMYK ink quantities calculated by an internal division method using the P sets of CMYK ink quantities is outputted as CMYK ink quantities corresponding to the input color.

PROBLEMS TO BE SOLVED BY THE INVENTION

However, the color conversion methods described above are attended with the following problems.

In the color image device using CMY three basic colors, to subdivide the color gamut in a color measuring space using triangular pyramids, information obtained by subdividing measuring points distributed in the basic color space in an order by using triangular pyramids in which measuring points are employed as four vertices thereof is directly applied to the subdivision in the color measuring space. FIG. 3 shows a state in which eight points P1 to P8 distributed in the basic color space are subdivided by five triangular pyramids; and when stable color reproducibility is attained, FIG. 3 shows that even if the subdivision information is applied to associated points in the color measuring space, the respective triangular pyramids are expressed not to overlap with each other as P1' to P8'. On the other hand, when the color reproducibility is unstable, a triangular pyramid (P1", P2", P3", P5") and a triangular pyramid (P2", P6", P5", P8") overlap with each other in a partial area (an area indicated by slants), for example, as indicated by P1" to P8". In this case, there exists a first problem that the color device values cannot be uniquely determined for input colors existing in the overlapped area.

Moreover, to increase color conversion precision, the number of color patches produced from the color image output device is required to be increased such that the measuring points are distributed more dense in the color measuring space. Also, devices to implement automation of color patch measurement are easily available and hence it is expected that the number of color measurement is increased. However, when the number of color patches is increased, it is likely that the first problem easily occurs, and hence there exists a second problem that the number of color patches to be measured is limited (an upper limit).

Furthermore, when CMKY four colors are basic colors, the color gamut is reduced in the color measuring space if the black color device value is increased, and hence there exists a third problem that when the black color device value is increased, it is likely that the first problem easily occurs.

Moreover, in the conventional color conversion methods, information attained by subdividing the measuring points distributed in a good order in the basic color space of CMK or CMKY by use of triangular pyramids in which the measuring points are used as four vertices thereof is directly applied to the subdivision in the color measuring space. In this case, there exists a fourth problem, that is, to facilitate subdivision by triangular pyramids in the basic color space, the color device values to construct color patches to be produced from the image output device cannot be freely set.

Also, when the image output device conducts color reproduction using at least five basic colors, the polyhedral subdivision in the basic color space becomes complex, and hence there exists a fifth problem that when at least five basic colors are used, the polyhedral subdivision in the basic color space is not practical.

A first object of the present invention is to provide, to solve the first and third problems, a color conversion method, a color converting device, and a color conversion program robust for unstableness in the color reproduction of a color image device.

A second object of the present invention is to provide, to solve the second problem, a color conversion method, a color converting device, and a color conversion program not requiring any restriction regarding the number of patches which are produced and measured in a color image device.

A third object of the present invention is to provide, to solve the fourth problem, a color conversion method capable of freely setting the color device value constituting color patches which are produced and color device value consisting color patches which are produced and measured in a color image device. That is, the object is to provide a color conversion method, a color converting device, and a color conversion program in which when there are given color device values uniformly distributed in a color measuring space or color device values generated in a random fashion and measured color data associated therewith, a color device value corresponding to an arbitrary color is calculated.

A fourth object of the present invention is to provide, to solve the fifth problem, a color conversion method, a color converting device, and a color conversion program which can be easily applied to a color image device conducting color reproduction in at least five basic colors as in the color reproduction in three and four basic colors.

DISCLOSURE OF THE INVENTION

A color conversion method in accordance with the present invention is characterized by comprising a color data input step of reading therein color device values and measured color data thereof in a color image device, a Delaunay diagram constructing step of subdividing a color gamut of the color image device including the measured color data distributed in a three-dimensional color space using Delaunay tetrahedrons having the measured data as vertices, a Delaunay tetrahedron searching step of searching for a Delaunay tetrahedron including given input colors through the Delaunay tetrahedrons, and a color device value calculating step of calculating color device values corresponding to the input colors using relative positions of the input colors in the Delaunay tetrahedron and color device values corresponding to four vertices of the Delaunay tetrahedron.

Furthermore, the color conversion method in accordance with the present invention is characterized by further comprising a paste processing and color device value calculating step of pasting, when the Delaunay tetrahedron including the input colors thus given cannot be retrieved, the input colors to a point on a triangular plane of one of the Delaunay tetrahedrons existing on a surface of the color gamut and calculating color device values corresponding to the input colors using a relative position of the point on the triangular plane and color device values corresponding to three vertices of the triangular plane.

Moreover, the color conversion method in accordance with the present invention is characterized by comprising the Delaunay diagram constructing step implemented by adding processing of deleting unnecessary Delaunay tetrahedrons to the Delaunay diagram constructing step.

Also, the color conversion method in accordance with the present invention is characterized in that the processing executed in the Delaunay tetrahedron searching step and the processing executed in the color device value calculating step are achieved by one processing part.

A color converting device in accordance with the present invention is characterized by comprising a color data input section for reading therein color device values and measured color data thereof in the color image device, a color data storage memory for storing a set of the color device values and the measured color data thereof, a Delaunay diagram constructing section for subdividing a color gamut of the color image device including the measured color data distributed in a three-dimensional color space using Delaunay tetrahedrons having the measured data as vertices, a Delaunay tetrahedron storage memory for storing subdivision information of the Delaunay tetrahedrons, a Delaunay tetrahedron searching section for searching for, for input colors, a Delaunay tetrahedron including the input colors through the Delaunay tetrahedrons; and a color device value calculating section for calculating color device values corresponding to the input colors using relative positions of the input colors in the Delaunay tetrahedron including the input colors and color device values corresponding to four vertices of the Delaunay tetrahedron.

Furthermore, the color converting device in accordance with the present invention is characterized by comprising a paste processing and color device value calculating section for pasting, when the Delaunay tetrahedron searching section cannot retrieve the Delaunay tetrahedron including the input colors thus given, the input colors to a point on a triangular plane of one of the Delaunay tetrahedrons existing on a surface of the color gamut and calculating color device values corresponding to the input colors using a relative position of the point on the triangular plane and color device values corresponding to three vertices of the triangular plane.

Moreover, the color converting device in accordance with the present invention is characterized by comprising a Delaunay diagram constructing and shaping section including to execute processing to construct a Delaunay diagram and processing to delete unnecessary Delaunay tetrahedrons for the Delaunay diagram constructing section.

Additionally, the color converting device in accordance with the present invention is characterized in that the Delaunay tetrahedron searching section and the color device value calculating section are replaced by a Delaunay tetrahedron searching and color device value calculating section to execute the Delaunay tetrahedron search and the color device value calculation.

A color conversion program in accordance with the present invention is characterized in that the function of the color converting device is implemented by a computer program.

Therefore, it is possible to attain an advantage that a color conversion method, a color converting device, and a color conversion program of the present invention make it possible to implement high-precision color conversion robust for unstableness of color reproduction in a color image device while measured color data is highly appreciated. Also, it is possible to remove the restriction regarding the way of supplying the number of color patches which are produced and for which color measuring is conducted by the color image device and color device values constituting the color patches, and hence there can be attained an advantage that color patches can be freely created. Moreover, there can be obtained an advantage that a color conversion method of the present invention can be easily applied even when the color image device conducts color reproduction in at least five base colors as in the color reproduction in three and four basic colors.

BRIEF DESCRIPTION OF DRAWINGS

FIG. 4 is a diagram showing a Delaunay diagram in a three-dimensional space.

FIG. 5 is a diagram sowing an example of data structure to record linkage information of measured color data distributed in a three-dimensional space subdivided by using Delaunay tetrahedrons.

FIG. 9 is a diagram showing steps in a first color conversion method.

FIG. 11 is a diagram showing steps in a fourth color conversion method.

FIG. 12 is a block diagram of a color converting device 100 in a first embodiment.

FIG. 13 is a diagram showing an example of color data recorded in a color data storage memory.

FIG. 14 is a block diagram of a color converting device 101 in a second embodiment.

FIG. 15 is a block diagram of a color converting device 102 in a third embodiment.

FIG. 16 is a block diagram of a fourth color converting device 103.

Figure 1:
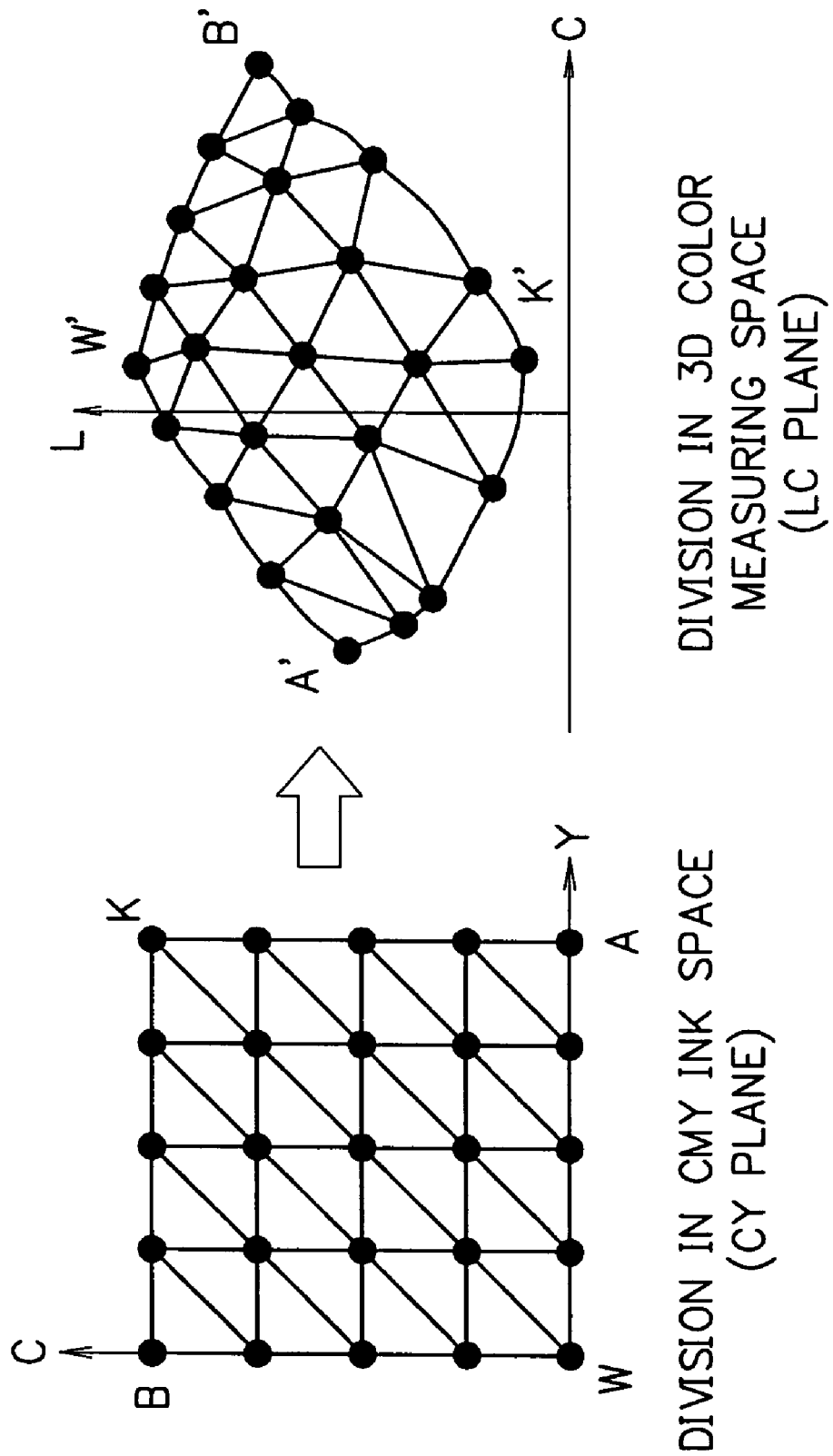
FIG. 1 is a diagram showing a method of subdividing by using triangular pyramids employed in a conventional color conversion method.
Figure 2:
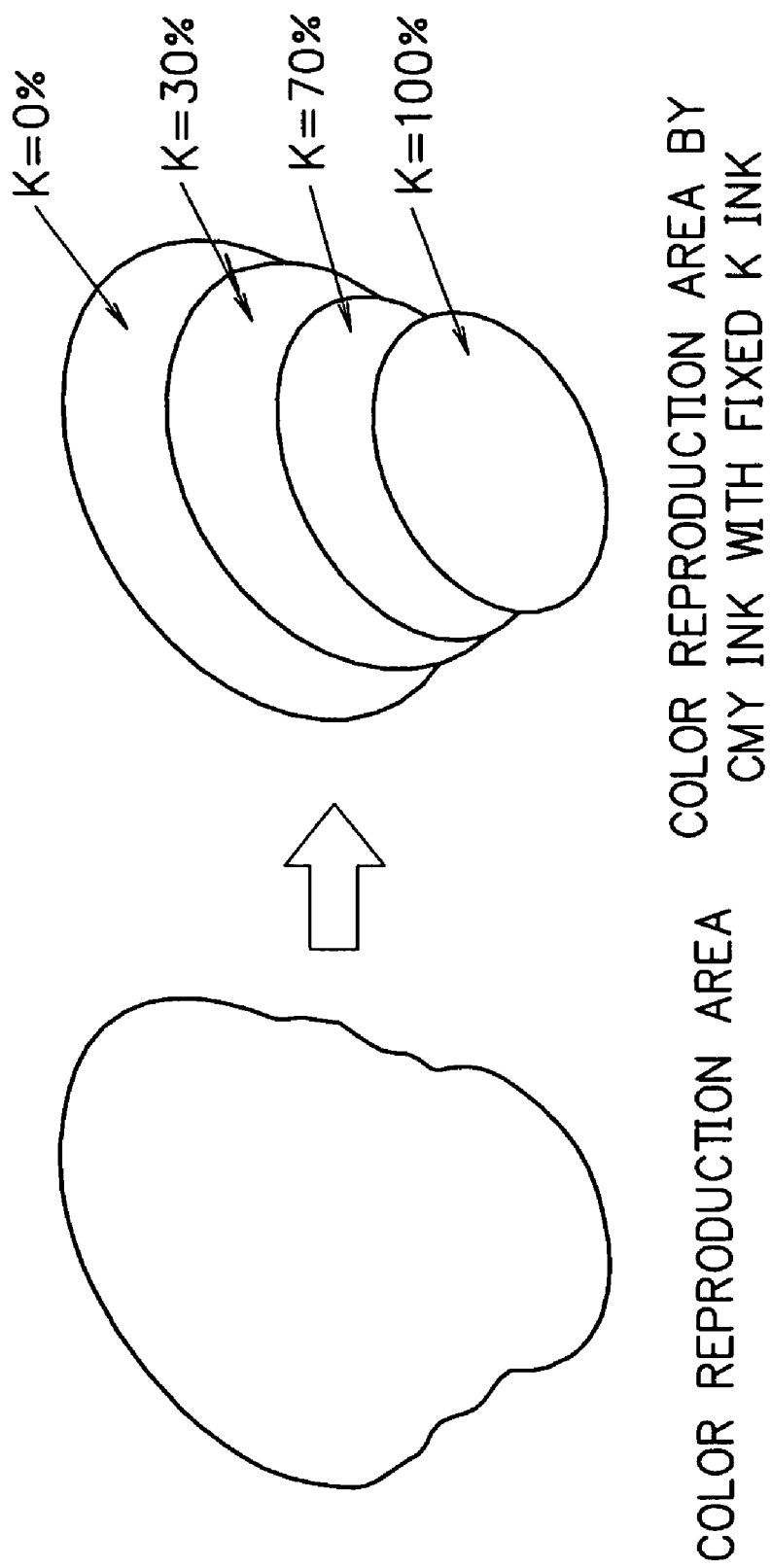
FIG. 2 is a diagram showing a technique of a conventional color conversion method corresponding to CMKY four color inks.
Figure 3:
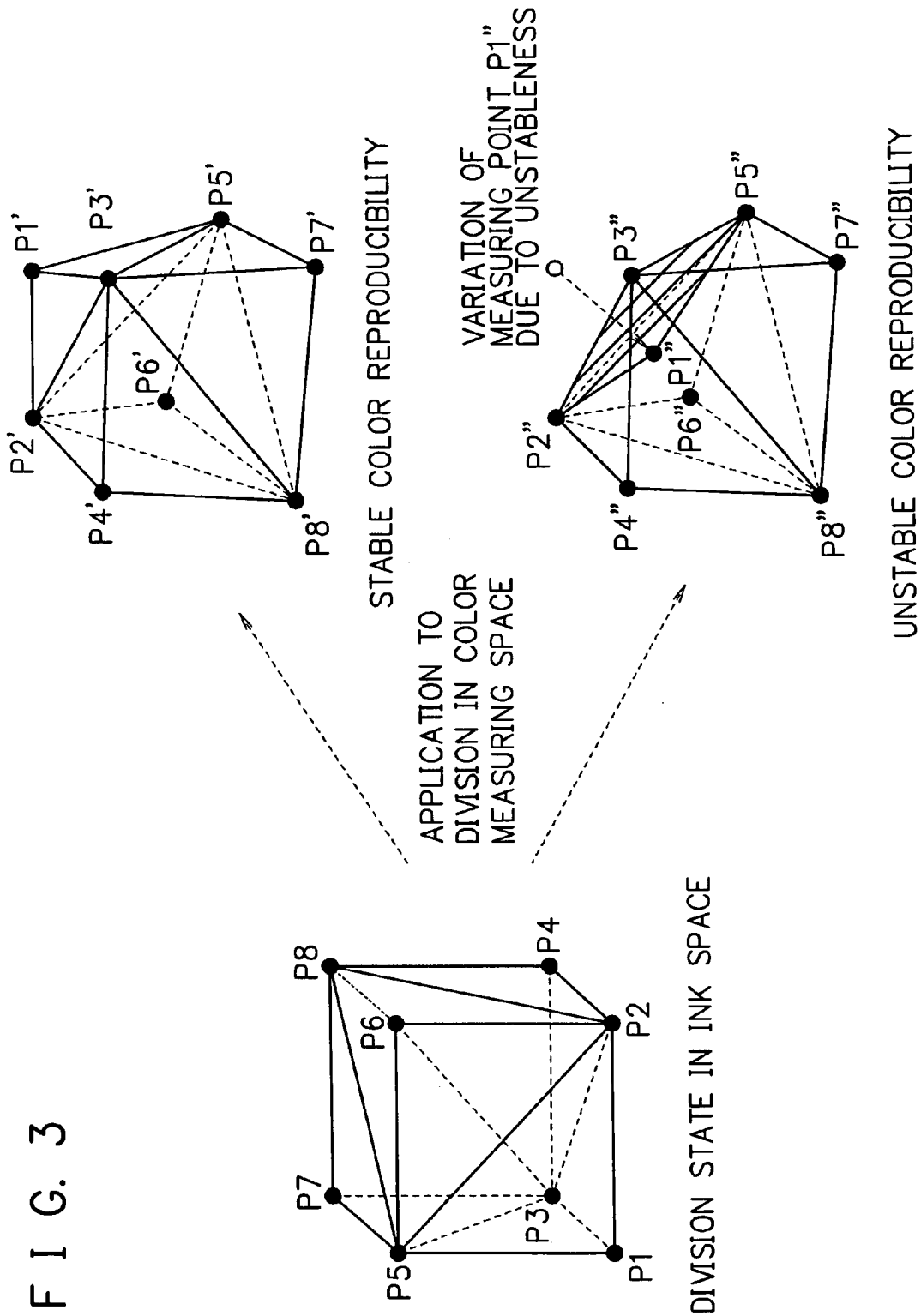
FIG. 3 is a diagram to explain problems of the conventional method for a color image device with unstable color reproducibility.

Incidentally, a reference numeral 1 is color data input means. A reference numeral 2 is a color data storage memory. A reference numeral 3 is Delaunay diagram constructing means. A reference numeral 4 is a Delaunay tetrahedron storage memory. A reference numeral 5 is Delaunay tetrahedron searching means. A reference numeral 6 is color device value calculating means. A reference numeral 7 is paste processing and color device value calculating means. A reference numeral 8 is Delaunay diagram constructing and shaping means. A reference numeral 9 is Delaunay tetrahedron searching and color device value calculating means. A reference numeral 20 is a color conversion program. A reference numeral 21 is a color conversion line unit (LUT). A reference numeral 22 is an image conversion program. A reference numeral 100 is a color converting device. A reference numeral 101 is a color converting device. A reference numeral 102 is a color converting device. A reference numeral 103 is a color converting device. A reference numeral 200 is a computer system.

BEST MODE FOR CARRYING OUT THE INVENTION

Next, description will be given in detail of an embodiment of the present invention by referring to the drawings.

First, a color conversion method of the present invention will be described.

In the color conversion method of the present invention, a plurality of color patches constructed by combinations of arbitrary device values are first outputted to or displayed on a color image device conducting color reproduction in N basic colors. Then, color measuring is conducted for all color patches to attain measured color data, for example, tristimulus values X, Y, Z and a uniform color space L*a*b*. A color device value and a measured color value are stored for each color patch. In this regard, the color measuring of the color patches aims at obtaining a color gamut of the color image device, and precision of the color conversion depends on its sampling density. Therefore, to increase the color conversion precision, the number of color patches are increased to be uniformly distributed in the color gamut of the color image device. In this connection, since the way of selecting color device values constituting the color patches is not particularly restricted, the color device values may be generated for use, for example, by using random numbers.

Next, the color gamut of the color image device expressed by measured color data distributed in the three-dimensional space is subdivided by using Delaunay tetrahedrons. The method of subdividing the color gamut using Delaunay tetrahedrons is implemented by constructing Delaunay tetrahedrons such that a sphere passing four measured color data not existing on one plane is obtained and a Delaunay tetrahedron is constructed using the four measured color data as its vertices while no measured color data exists within the sphere.

In a concrete example of the method of constructing a Delaunay diagram for data points distributed in a three-dimensional space, there is obtained a combination of four data points which do not exist on one plane and which construct a sphere within which no data point exists. Four data points P1, P2, P3, and P4 of FIG. 4 are points on a surface of a sphere S1. No other data point exists within the sphere S1. Therefore, the tetrahedron constructed by P1, P2, P3, and P4 is a Delaunay tetrahedron. Thereafter, for three triangular planes of the Delaunay tetrahedron, a search is made to obtain data points to construct another Delaunay tetrahedron other than the present Delaunay tetrahedron. In the Delaunay tetrahedron constructed by P1, P3, and P4 and shown in FIG. 4, another Delaunay tetrahedron including a triangular plane constructed by P1, P3, and P4 is constructed by adding a data point P5, namely, by four points by P1, P3, P4, and P5. Incidentally, in this state, four points P1, P3, P4, and P5 exist on a surface of the sphere S2 and no other data point exist within the sphere S2. This processing is executed until there takes place a state in which a new Delaunay tetrahedron is not added.

In an example of a method of determining whether or not other data points exist within the sphere S1, a central point and a radius R1 of the sphere S1 are calculated and distance L between the central point and a data point is calculated to compare the radius R1 with the distance L. If the distance L is more than the radius R1, the data point exists outside the sphere S1.

When a finite number of but a large number of data points are distributed in a three-dimensional space, the operation can be efficiently conducted at a high speed by using a Voronoi diagram Delaunay diagram constructing algorithm according to a sequential generatrix addition method described in articles: Inagaki, "Robust Algorithm for Incremental Construction of Three-Dimensional Voronoi Diagrams", Journal of Information Processing Society of Japan (Vol. 35, No. 1, pp. 1-10, 1994) and Inagaki, "Problem Caused by Degeneracy in Construction of the Three-Dimensional Delaunay Diagram and Its Solution", Transactions of IEICE of Japan (B, D-II, Vol. J79-D-II, No. 10, pp. 1696-1703, 1996).

In the Voronoi diagram-Delaunay diagram constructing algorithm according to a sequential generatrix addition method, highest priority is assigned to the retaining of topological characteristics to mathematically stabilize the Voronoi diagram. Necessary conditions of topological characteristics to be satisfied by a three-dimensional Voronoi diagram are as below.

[1] Each generatrix has a Voronoi area which is not empty.
[2] Voronoi areas are simply connected.
[3] Two Voronoi areas share at most one Voronoi plane.

(In this regard, necessary and sufficient conditions for a three-dimensional Voronoi diagram are unknown).

In a Voronoi diagram update procedure when new generatrices are added to a Voronoi diagram for several generatrices arbitrarily selected from a given set of generatrices, the following steps are carried out while making a check to confirm there exists no conflict with the three topological characteristics described above.

[Update Procedure]

(1) A set of Voronoi points included in a Voronoi area of the new generatrix are detected. By deleting the set, items satisfying the three topological characteristics are selected.

(2) New Voronoi points are generated on an edge linking a Voronoi point to be deleted with a Voronoi point which is adjacent thereto and which is to be kept remained.

(3) For each Voronoi area, new edges and planes are generated by linking the new Voronoi points thus generated.

(4) A new tetrahedral area is generated by deleting an internal region of an area enclosed with the new planes.

Since a Delaunay diagram is a dual diagram of a Voronoi diagram, when a Voronoi diagram is obtained, a Delaunay diagram is readily obtained. Incidentally, it is considered that an event in which data points (generatrices) distributed in a color space obtained by measuring color patches enter a degenerate state occurs with a considerably low probability. As in the Voronoi diagram Delaunay diagram constructing method, by using topological characteristics as a basis, there is obtained an advantage that the exception processing for the degeneration is not required.

Incidentally, a field of sets of Delaunay tetrahedrons constructed by the two Delaunay diagram constructing algorithms form a convex hull. Therefore, depending on the contour of the color gamut of the color image device, it is required to delete unnecessary ones from the constructed Delaunay tetrahedrons. In a method to delete the unnecessary Delaunay tetrahedrons, processing is executed for Delaunay tetrahedrons existing on the surface to delete Delaunay tetrahedrons exceeding a threshold value by using, for example, (1) a method of evaluating the contour of a Delaunay tetrahedron according to a size of a triangle.

(2) a method of evaluating it according to the length of a side of a triangular plane on the surface.

The processing is executed until there exists no Delaunay tetrahedron to be deleted.

Description will be given of a method of recording linkage information of measured color data distributed in a three-dimensional space subdivided using Delaunay tetrahedrons in the method described above. FIG. 5 shows an example of data structure to store the linkage information of measured color data distributed in a three-dimensional space subdivided using Delaunay tetrahedrons. In the data structure, it is possible to describe an identifier number allocated to the Delaunay tetrahedron, numbers of four measured color data constituting the Delaunay tetrahedron; and for each of four triangular planes constituting the Delaunay tetrahedron, numbers of three measured color data constituting the triangular plan, and adjacent information of the triangular plan. In this case, as the identifier number of the Delaunay tetrahedron, a sequential number is assigned to each Delaunay tetrahedron when the Delaunay diagram is constructed. Additionally, when the triangular plane is adjacent to a second Delaunay tetrahedron, an identifier number of the second Delaunay tetrahedron is described as the adjacent information. When such an adjacent Delaunay tetrahedron is absent, an identifier indicating the condition is set thereto. A Delaunay tetrahedron is adjacent to at least one other Delaunay tetrahedron. When at least one of the four triangular planes constituting the Delaunay tetrahedron is not adjacent to any other Delaunay tetrahedron, it is indicated that the Delaunay tetrahedron is on the surface.

Figure 6:
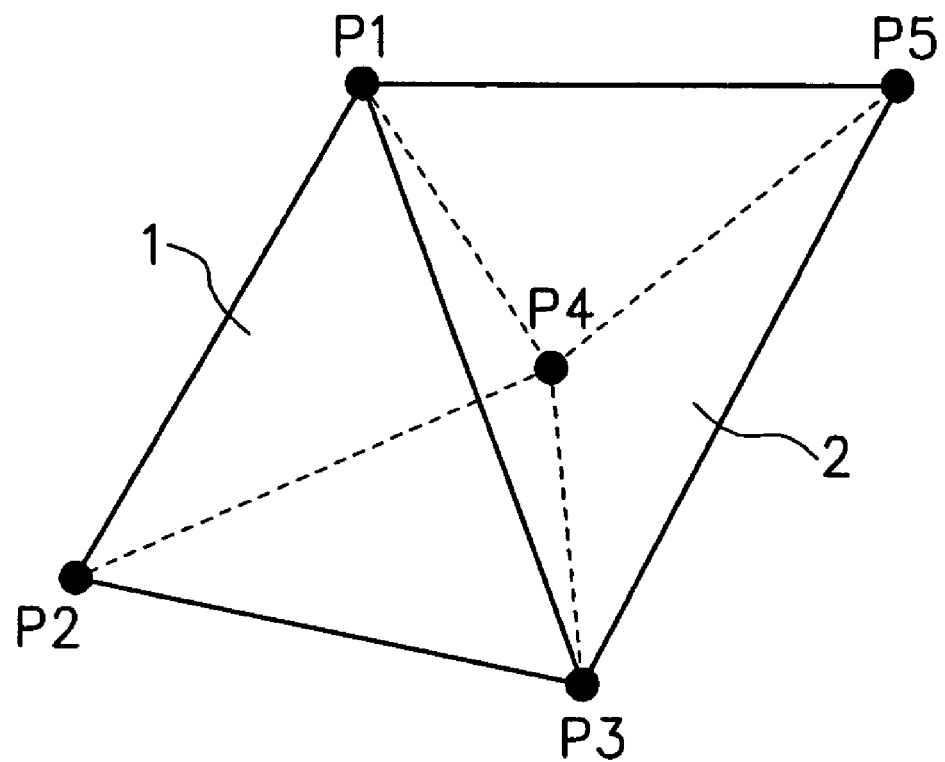
FIG. 6 is a diagram to explain a Delaunay diagram for five points in a three-dimensional space.
Figure 7:
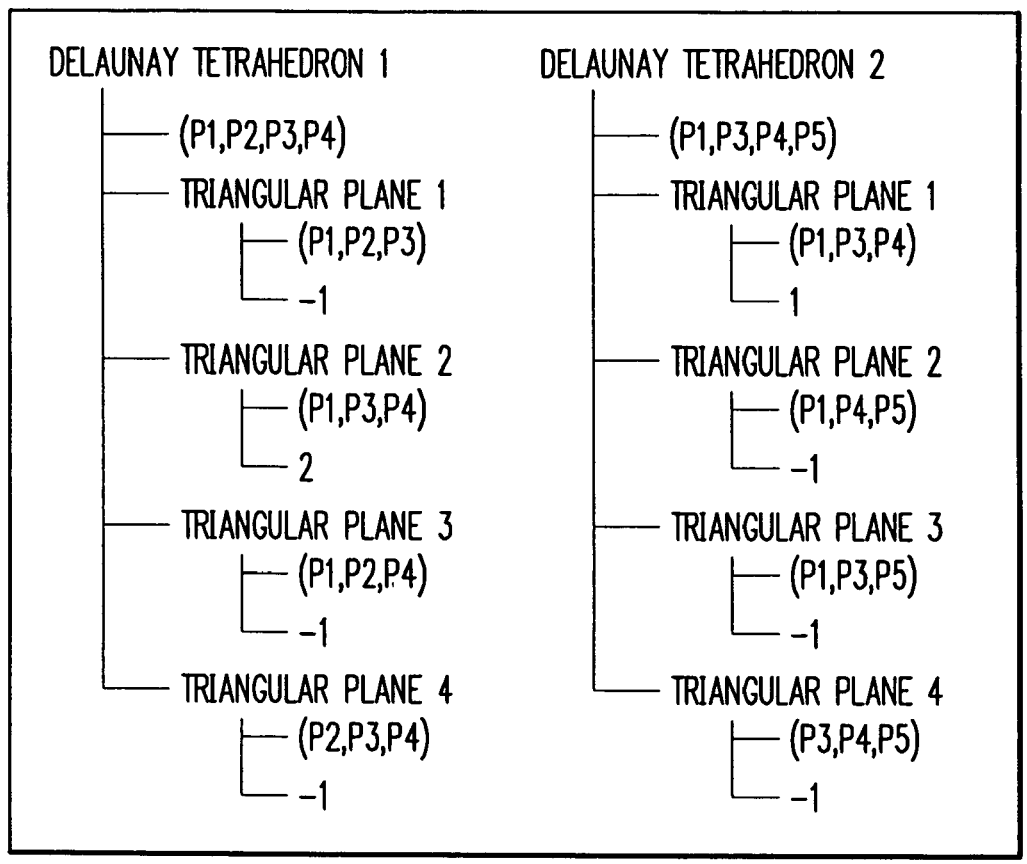
FIG. 7 is a diagram showing a result in which the Delaunay

FIG. 6 shows a state in which a color gamut in a three-dimensional space constituted by five measured color data P1 to P5 is subdivided using two Delaunay tetrahedrons. The Delaunay tetrahedron constructed by (P1,P2,P3,P4) is indicated by 1 and that constructed by (P2,P3,P4,P5) is indicated by 2. FIG. 7 shows an example of data structure to store linkage information of measured color data distributed in the three-dimensional color space. In FIG. 7, an identifier of a case in which there does not exist a Delaunay tetrahedron adjacent to a triangular plane is −1.

Next, for an arbitrary input color, a search is made for a Delaunay tetrahedron including the input color from the group of Delaunay tetrahedrons in the three-dimensional color space. As a method of searching for the Delaunay tetrahedron, the method described in Japanese Patent Laid-Open Publication Ser. No. 06-022124 can be used. In a method of selecting one Delaunay tetrahedron including a color from a plurality of Delaunay tetrahedrons, one point A is selected from four vertices of a Delaunay tetrahedron. Thereafter, lines of intersection of three triangular planes passing point A are expressed as vectors, V1, V2, and V3 with point A as an origin thereof. Moreover, when a vector which links point A with an arbitrary point X is assumed to be represented as V, its position vector V is expressed as $$V = aV1 + bV2 + cV3 \tag{1}$$

If the coefficients (a,b,c) satisfies a condition of $$0 \leq a, b, c \leq 1.0 \text{ and } a+b+c \leq 1.0 \tag{2},$$

point X exists within the Delaunay tetrahedron. Incidentally, if the input color is a color existing in the color gamut of the color image device, there exists at least one Delaunay tetrahedron including the input color. When the input color is on a boundary plane or a boundary line of the Delaunay tetrahedrons, there exist two or more Delaunay tetrahedrons. However, it is only necessary to dispose, for example, a rule in which a Delaunay tetrahedron previously retrieved is set as a target Delaunay tetrahedron.

Color device values corresponding to the input value can be calculated by interpolation using color device values in the color image device corresponding to four vertices of the retrieved Delaunay tetrahedron and relative positions of the input color in the Delaunay tetrahedron. As the interpolation, the method described in Japanese Patent Laid-Open Publication Ser. No. 06-022124 can be used. In this connection, although the method described in Japanese Patent Laid-Open Publication Ser. No. 06-022124 is explained for three CMY colors, but the method can be easily expanded also for four or more basic colors.

Incidentally, in the search processing for the Delaunay tetrahedron and the calculation processing of color device values, the same coefficients (a,b,c) are used in the respective processing, and hence the two processing can be combined into one processing part. Japanese Patent Laid-Open Publication Ser. No. 06-022124 describes an example of this method.

When any Delaunay tetrahedron including the input color cannot be retrieved, it is indicated that the input color is a color outside the color gamut of the color image device. For such an input color, a triangular plane is retrieved from a plurality of triangular planes forming the surface of the color gamut, the triangular plane intersecting a line segment linking a point within the color gamut with the input color. Thereafter, an intersection between the triangular plane and the line segment is assumed as a reproduced color of the input color on the color image device to calculate color device values corresponding to the reproduced color.

Figure 8:
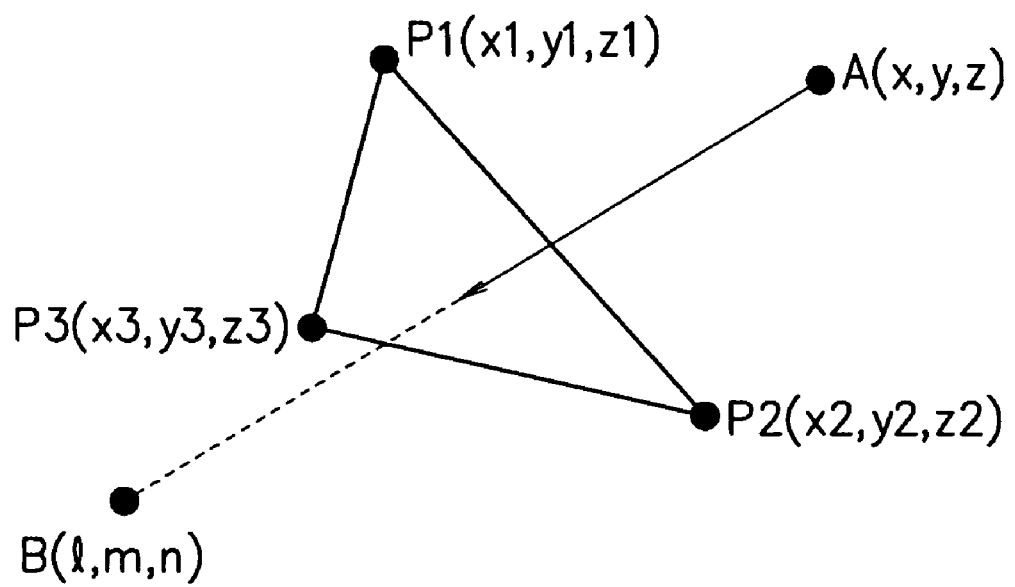
FIG. 8 is a diagram to explain processing to paste triangles.

Assume now that an input color (x,y,z) outside the color gamut of the color image device is given as shown in FIG. 8. A method of retrieving a triangular plane intersecting line segment AB linking the input color with point B(l,m,n), which is a point within the color gamut, is as follows. Assume that an intersection between line segment AB and a triangular plane configured by point P1 (x1,y1,z1), point P2 (x2,y2,z2), and point P3 (x3,y3,z3) is X. The intersection X to exist in the triangular plane, when (a,b,c) calculated by $$\begin{bmatrix} a \\ b \\ c \end{bmatrix} = \begin{bmatrix} x2-x1 & x3-x1 & x-1 \\ y2-y1 & y3-y1 & y-m \\ z2-z1 & z3-z1 & z-n \end{bmatrix}^{-1} \begin{bmatrix} x-x1 \\ y-y1 \\ z-z1 \end{bmatrix} \quad (3)$$

satisfy $$a \geq 0,\ b \geq 0,\ a+b \leq 1,\ \text{and}\ 0 \leq c \leq 1.0 \quad (4).$$

That is, there is retrieved a triangular plane for which the variables a, b, and c obtained by expression (3) satisfy the conditional expression (4). Thereafter, an intersection X between the triangular plane and line segment AB is set as a reproduced color of the input color A. The device color values of the color image device corresponding to the intersection X can be calculated by interpolation using device color values of the color image device corresponding to three vertices of the triangular plane and the relative position of the intersection X on the triangular plane. For example, when the device color values as N basic colors of the color image device corresponding to P1, P2, and P3 are respectively (C1,M1,Y1,...,X1), (C2,M2,Y2,...,X2), and (C3,M3,Y3,...,X3), the device color values (C,M,Y,...,X) at the intersection X are as below.

$$\begin{bmatrix} C \\ M \\ Y \\ \cdots \\ X \end{bmatrix} = a \begin{bmatrix} C2-C1 \\ M2-M1 \\ Y2-Y1 \\ \cdots \\ X2-X1 \end{bmatrix} + b \begin{bmatrix} C3-C1 \\ M3-M1 \\ Y3-Y1 \\ \cdots \\ X3-X1 \end{bmatrix} + \begin{bmatrix} C1 \\ M1 \\ Y1 \\ \cdots \\ X1 \end{bmatrix} \quad (5)$$

N-color color device values where, the coefficients a and b are calculated by expression (3) and satisfy conditional expression (4).

When the color gamut on the input side and that on the output side are known, color area compression to adjust the color gamut on the input side to that on the output side is beforehand conducted for the color gamut on the input side depending on cases. For the input color, data undergone the color area compression may be inputted. Moreover, the color conversion method of the present invention may be used as a method to obtain optimal color area compression to adjust the color gamut on the input side to that on the output side.

In summary, the first color conversion method of the present invention includes, as shown in FIG. 9, step 1 to read color device values of the color image device and a plurality of sets of measured data thereof, step 2 to subdivide the color gamut constructed by measured color data distributed in the three-dimensional color space using Delaunay tetrahedrons, step 3 to search for a Delaunay tetrahedron including the color of input colors given thereto, and step 4 to calculate device values corresponding to the input color using the relative position of the input color in the Delaunay tetrahedron and device values of the color image device corresponding to four vertices of the Delaunay tetrahedron.

Figure 10:
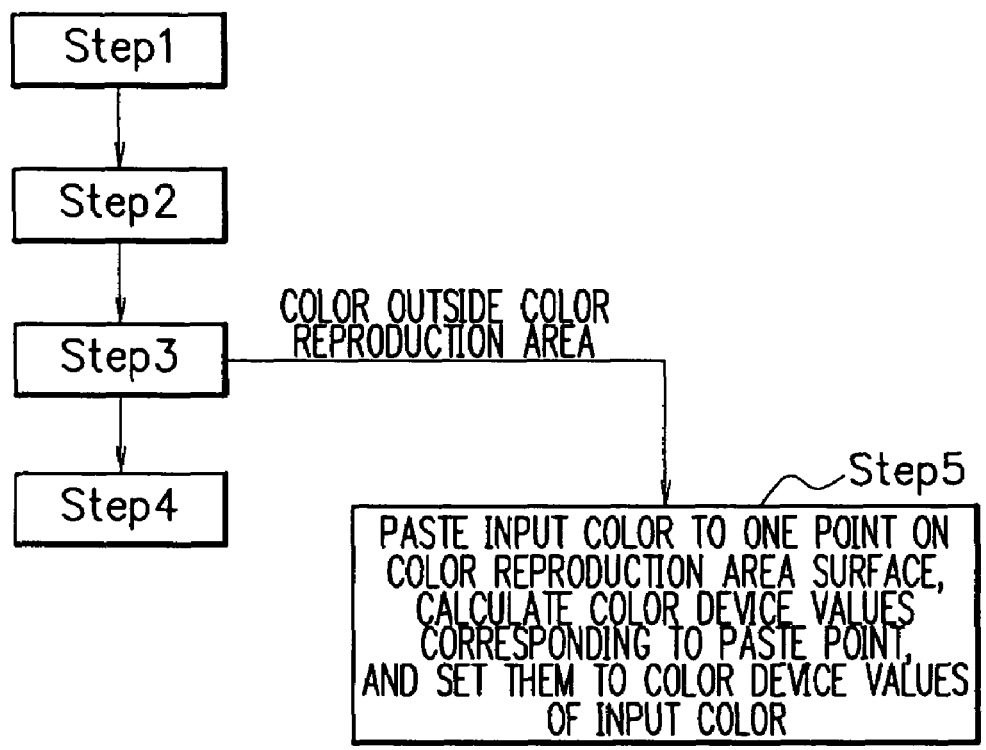
FIG. 10 is a diagram showing steps in a second color conversion method.

Furthermore, as shown in FIG. 10, the second color conversion method of the present invention includes, in addition to the first color conversion method, step 5 which pastes, when it is impossible to retrieve a Delaunay tetrahedron including the given input color in step 3, the input color on one point on a triangular plane of one of the Delaunay tetrahedrons existing on the surface of the color gamut to calculate color device values corresponding to the input color using the relative position of the point on the triangular plane and color device values corresponding to three vertices of the triangular plane.

Additionally, the third color conversion method of the present invention is configured by replacing step 2 of the first and second color conversion methods by step 2' including, in addition to step 2, processing to subdivide the color gamut constructed by the measured color data distributed in the three-dimensional color space by Delaunay tetrahedrons to thereafter delete unnecessary ones of the Delaunay tetrahedrons.

Furthermore, the fourth color conversion method of the present invention is configured by replacing the Delaunay tetrahedrons retrieval processing of step 3 and the color device value calculation processing of step 4 in the first to fourth color conversion methods by step 6 in which both processing is combined into one processing part Next, description will be given in detail of an embodiment of the present invention by referring to the drawings.

Referring to FIG. 12, there is shown a color converting device 100 as a first embodiment of the present invention. The device 100 includes color data input means 1 for reading therein color device values and measured color data of a color image device given as inputs, a color data storage memory 2 for storing the color device values and the measured color data thus obtained, Delaunay diagram constructing means 3 for subdividing a color gamut of the color image device constituted by the measured color data distributed in a three-dimensional space using Delaunay tetrahedrons, a Delaunay tetrahedron storage memory 4 for storing subdivision information of the Delaunay tetrahedrons, Delaunay tetrahedron searching means 5 for searching for a Delaunay tetrahedron including the input color from the Delaunay tetrahedrons, and color device value calculating means 6 for calculating color device values corresponding to the input color using the relative position of the input color in the Delaunay tetrahedron and color device values corresponding to four vertices of the Delaunay tetrahedron.

Operation of the color converting device 100 will be described. The color data input means 1 reads therein color device values and measured color data of the color image device given as inputs and stores a data number, the color device value, and the measured color in the color data storage memory 2, for example, as shown in FIG. 13. The Delaunay diagram constructing means 3 subdivides a color gamut of the color image device constituted by the measured color data stored in the memory 2 and distributed in a three-dimensional space using Delaunay tetrahedrons having the measured data as vertices. The method of constructing the Delaunay diagram is as described for the color conversion method. Moreover, the means 3 expresses the subdivision information of the Delaunay tetrahedrons, for example, in the data structure shown in FIG. 7 to record the information in the Delaunay tetrahedron storage memory 4. For the given input color, the Delaunay tetrahedron searching means 5 searches for a Delaunay tetrahedron including the input color from the Delaunay tetrahedrons stored in the memory 4. The method of searching for a Delaunay tetrahedron including the input color is as described in conjunction with the color conversion method. The color device value calculating means 6 calculates and outputs color device values of the color image device corresponding to the input color by interpolation calculation using the relative position of the input color in the Delaunay tetrahedron retrieved by the means 5 and color device values corresponding to four vertices of the Delaunay tetrahedron. The method of calculating the color device values corresponding to the input color is as described in conjunction with the color conversion method.

Next, description will be given of the color converting device 101 as a second embodiment of the present invention.

FIG. 14 is a block diagram showing the color converting device 101. The device 101 is implemented by adding, to the configuration of the color converting device 100, paste processing and color device calculating means 7 which pastes, when a Delaunay tetrahedron including the input color cannot be retrieved, the input color to a point on a triangular plane of one of the Delaunay tetrahedrons existing on the surface of the color gamut and which calculates color device values corresponding to the input color using the relative position of the point on the triangular plane and color device values corresponding to three vertices of the triangular plane.

The means and the memories other than the paste processing and color device calculating means 7 in the color converting device 101 function as processing operations or storage memories which are equal to those of the color converting device 100. The means 7 pastes, when the Delaunay tetrahedron searching means 5 cannot retrieve a Delaunay tetrahedron including the input color, the input color to a point on a triangular plane of one of the Delaunay tetrahedrons existing on the surface of the color gamut and then calculates color device values corresponding to the input color using the relative position of the point on the triangular plane and color device values corresponding to three vertices of the triangular plane. The paste processing method and the color device value calculating method are as described for the color conversion method of the present invention.

Next, description will be given of the color converting device 102 as a third embodiment of the present invention.

FIG. 15 is a block diagram showing the color converting device 102. The device 102 is implemented by replacing the Delaunay diagram constructing means 3 of the color converting device 101 by Delaunay diagram constructing and shaping means 8.

The means and the memories other than the Delaunay diagram constructing and shaping means 8 in the color converting device 102 function as processing operations or storage memories which are equal to those of the color converting device 101. The means 8 executes processing to construct a Delaunay diagram by subdividing the color gamut constituted by measured data distributed in the three-dimensional color space using Delaunay tetrahedrons and then to delete unnecessary Delaunay tetrahedrons. The Delaunay diagram constructing method and the method of deleting unnecessary Delaunay tetrahedrons are as described for the color conversion method of the present invention.

In this connection, it is also possible to replace the Delaunay diagram constructing means 3 of the color converting device 100 by the Delaunay diagram constructing and shaping means 8.

Next, description will be given of the color converting device 103 as a fourth embodiment of the present invention.

FIG. 16 is a block diagram showing the color converting device 103. The device 103 is implemented by replacing the Delaunay tetrahedron searching means 5 and the color device value calculating means 6 of the color converting device 102 in FIG. 15 by Delaunay tetrahedron searching and color device calculating means 9.

The means and the memories other than the Delaunay tetrahedron searching and color device calculating means 9 in the color converting device 103 function as processing operations or storage memories which are equal to those of the color converting device 102. As described also for the color conversion method, the processing to search for a Delaunay tetrahedron including the input color and the processing to calculate color device values corresponding to the input color can be combined into one processing part. This is implemented as the Delaunay tetrahedron searching and color device calculating means 9.

In this regard, the Delaunay tetrahedron searching means 5 and the color device calculating means 6 in the color converting device 100 to 102 can also be replaced by the Delaunay tetrahedron searching and color device calculating means 9.

It is also possible to configure a computer system in which the color converting devices 100 to 103 are implemented by software programs and the color conversion is achieved by mounting the programs on a computer.

Figure 17:
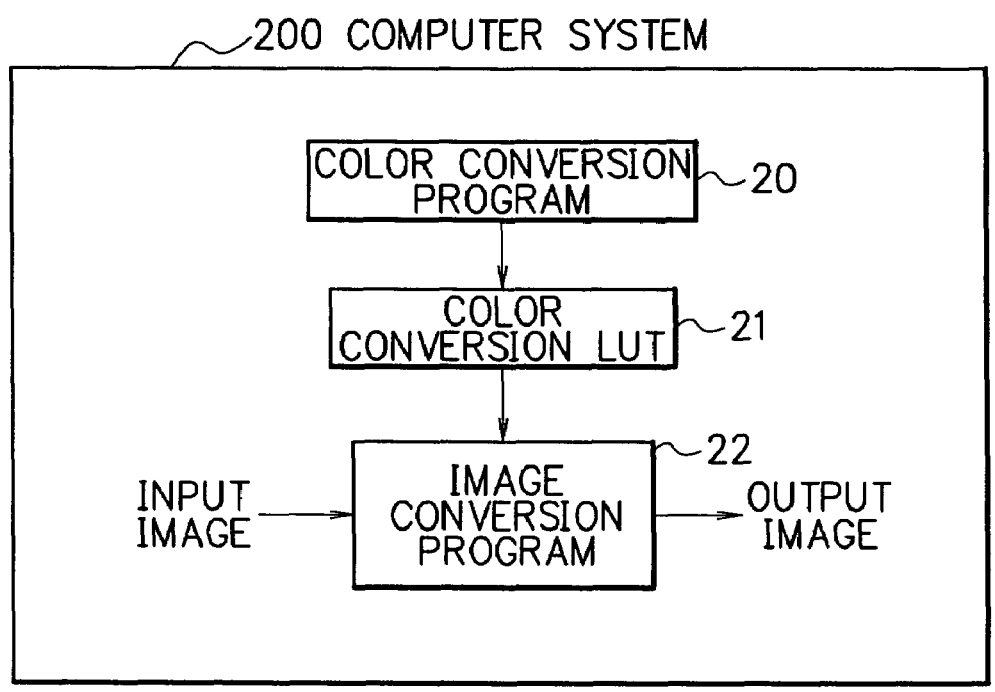
FIG. 17 is a block diagram of a computer system in which a color conversion program is installed.

FIG. 17 shows an example of a computer system on which a color conversion program is mounted. The computer system 200 of FIG. 17 includes a color conversion program 20, a color conversion LUT 21, and an image conversion program 22. The computer system 200 conducts a color conversion for an input image to generate an output image. The color conversion program 20 is a software program implementing one of the color converting devices 100 to 103. For a plurality of input colors set in advance, the program 20 calculates color device values of the color image device on the output side and describes the values in the color conversion LUT 21. The image conversion program 22 converts by the LUT 21 a color of each pixel read from an input image into a color device value of the color image device on the output side.

INDUSTRIAL APPLICABILITY

As described above, the present invention leads to advantages as follows.

A first advantage is that there can be provided a color conversion method, a color converting device, and a color conversion program robust for unstableness of color reproduction in a color image device.

The reason is that the subdivision information of triangular pyramids in the device color space of the color converting device is not required to construct a Delaunay diagram using only measured color data distributed in a three-dimensional color space to subdivide the color gamut of the color image device using Delaunay tetrahedrons.

A second advantage is that there can be provided a color conversion method, a color converting device, and a color conversion program not requiring the restriction regarding the number of color patches produced from and measured by the color image device.

A third advantage is that there can be provided a color conversion method, a color converting device, and a color conversion program capable of freely setting color device values constituting the color patches produced from and measured by the color image device.

A fourth advantage is that there can be provided a color conversion method, a color converting device, and a color conversion program which can be easily applied also to a color image device conducting color reproduction in at least five basic colors as in the color reproduction in three and four basic colors.

The reasons for the second, third, and fourth advantages are the same as the reason for the first advantage, namely, it is not required to conduct the subdivision of triangular pyramids which is beforehand conducted in the device color space of the color image device.

The invention claimed is:

1. A color conversion method for a color image device, characterized by comprising:
    a color data input step of reading therein color device values and measured color data thereof in the color image device;
    a Delaunay diagram constructing step of constructing a Delaunay diagram representing a color gamut of the color image device by subdividing the color gamut of the color image device including the measured color data distributed in a three-dimensional color space using Delaunay tetrahedrons and deleting Delaunay tetrahedrons formed on a concave surface of the color gamut of the color image device;
    a Delaunay tetrahedron searching step of searching for a Delaunay tetrahedron including given input colors through the Delaunay diagram; and
    a color device calculating step of calculating color device values corresponding to the input colors using relative positions of the input colors in the Delaunay tetrahedron and color device values corresponding to four vertices of the Delaunay tetrahedron.

2. The color conversion method in accordance with claim 1, characterized by further comprising
    the Delaunay tetrahedron searching step of searching for, when the Delaunay tetrahedron including the input colors thus given cannot be retrieved, an intersection of a line segment linking the input color with a point within the color gamut of the color image device and a triangular plane of one of the Delaunay tetrahedrons existing on a surface of the color gamut; and
    the color device value calculating step of calculating color device values corresponding to the input colors using a relative position of the intersection on the triangular plane and color device values corresponding to three vertices of the triangular plane.

3. The color conversion method in accordance with claim 1 or 2, characterized in that processing executed in the Delaunay tetrahedron searching step and processing executed in the color device value calculating step are achieved by one processing part.

4. A color converting device for a color image device, characterized by comprising:
    color data input means for reading therein color device values and measured color data thereof in the color image device;
    a color data storage memory for storing a set of the color device values and the measured color data thereof;
    Delaunay diagram constructing means for constructing a Delaunay diagram representing a color gamut of the color image device by subdividing the color gamut of the color image device including the measured color data distributed in a three-dimensional color space using Delaunay tetrahedrons and deleting Delaunay tetrahedrons formed on a concave surface of the color gamut of the color image device;
    a Delaunay tetrahedron storage memory for storing information of the Delaunay diagram; Delaunay tetrahedron searching means for searching for, for input colors, a Delaunay tetrahedron including the input colors through the Delaunay diagram; and
    color device calculating means for calculating color device values corresponding to the input colors using relative positions of the input colors in the Delaunay tetrahedron including the input colors and color device values corresponding to four vertices of the Delaunay tetrahedron.

5. A color converting device according to claim 4, characterized by comprising
    the Delaunay tetrahedron searching means for searching for, when the Delaunay tetrahedron including the input colors thus given cannot be retrieved, an intersection of a line segment linking the input color with a point within the color gamut of the color image device and a triangular plane of one of the Delaunay tetrahedrons existing on a surface of the color gamut, and
    the color device calculating means for calculating color device values corresponding to the input colors using a relative position of the intersection on the triangular plane and color device values corresponding to three vertices of the triangular plane.

6. A color converting device in accordance with claim 4 or 5, characterized in that the Delaunay tetrahedron searching means and the color device value calculating means comprise a Delaunay tetrahedron searching and color device calculating means implementing the Delaunay tetrahedron searching operation and the color device value calculating operation in one processing part.

7. A computer-readable medium having stored thereon a program for making a computer function as a color converting device of claim 4 or 5.

8. A computer-readable medium having stored thereon a program for making a computer function as a color converting device of claim 6.

* * * * *